United States Patent [19]

Schoon

[11] Patent Number: 5,225,851
[45] Date of Patent: Jul. 6, 1993

[54] BAND IMAGING DEVICE

[75] Inventor: David J. Schoon, Mendota Heights, Minn.

[73] Assignee: Schoonscan, Inc., Mendota Heights, Minn.

[21] Appl. No.: 542,957

[22] Filed: Jun. 25, 1990

[51] Int. Cl.⁵ .............................................. H04N 1/21
[52] U.S. Cl. ..................................... 346/108; 346/1.1
[58] Field of Search .................. 346/107 R, 108, 160, 346/1.1

[56] References Cited

U.S. PATENT DOCUMENTS

| | | | |
|---|---|---|---|
| 4,389,655 | 6/1983 | Baues | 346/107 R |
| 4,435,064 | 3/1984 | Tsukada et al. | 346/107 R |
| 4,571,623 | 2/1986 | Schoon | 358/208 |
| 4,586,057 | 4/1986 | Schoon | 346/108 |
| 4,630,223 | 12/1986 | Schoon | 364/518 |
| 4,686,363 | 8/1987 | Schoon | 250/235 |
| 4,951,064 | 8/1990 | Kun et al. | 346/107 R |
| 5,054,893 | 10/1991 | Schoon | 359/254 |

Primary Examiner—Mark J. Reinhart
Attorney, Agent, or Firm—Merchant, Gould, Smith, Edell, Welter & Schmidt

[57] ABSTRACT

An electro-optic imager, used for exposing photosensitive media imagewise, wherein a linear array of scanning elements is scanned across a portion of the image, to produce a first region or band of image or information, and then translated in a direction parallel to the linear axis of the scanning elements for another scanning operation to produce a subsequent band, slightly overlapping the previous band. The translation, relative to the photoreceptor, of the scanning array is made very reproducible by establishing the position of a moving member by reference to that of a stationary notched or indented member or members, and the resultant image is made very uniform by adjusting the data controlling the imager within the region of redundant imaging to compensate for minor but known imperfections in this stationary member.

13 Claims, 7 Drawing Sheets

BAND IMAGING DEVICE

BACKGROUND OF THE INVENTION

The present invention relates to imaging devices, and more particularly to imaging devices where an image is reproduced by line scanning, wherein each scan sequence reproduces a plurality of image lines, but less than the entire image.

FIELD OF THE INVENTION

Imagers, usually laser imagers, are used to record electronically produced information on photographically sensitive media, e.g. photographic film or paper, or photoconductive drums, as in laser imagers or printers. Such devices are used in applications wherein information exists in an electronic form, and a visually observable presentation of the information is desired. Typically a single beam of light is directed sequentially across a photosensitive media, in a raster scan fashion. Typically a laser or laser diode is used to create such a beam. Alternatively, as many beams of light as there are pixels (picture elements) in a single scan line are imaged simultaneously. A linear array of light emitting diodes is typically used to create these beams.

DESCRIPTION OF THE PRIOR ART

Electro-optic imaging devices are typically used to expose a photosensitive media, such as photographic film or paper, according to information which is stored electronically. Typical applications include that of proofing color corrections which are made prior to making halftone separations suitable for subsequent making of printing plates. More and more with increasing technical development, image sources are not restricted to photographic films, but rather often the original is in electronic form, and a suitable means is needed for quickly and accurately making a photographic version of that same information.

The prior art devices include rotating drum scanners, wherein a photographic film or paper is wrapped around or inside a rotating drum, and one or more laser beams are directed at the rotating surface. The laser beam is slowly advanced parallel to the axis of the drum via a lead screw as the drum turns. Other devices utilize rotating polygon mirrors for sweeping a laser beam or beams across a surface. Laser beams are most commonly used, although other types of light sources, e.g. light emitting diodes, are used. In some cases, the use of light is avoided entirely, and minute stylii alter the charge on a drum, and this charge is subsequently used to attract or repel toner particles. These particles are then transferred to a piece of paper.

According to the prior art, imaging devices have typically either used a single scanning beam, the number of beams required for simultaneously reproducing all of the pixels in a single line of the image. This is particularly true in devices wherein high quality is desired. This is true despite the fact that there are strong incentives for the use of an intermediate number of scanning beams.

When only a single beam is used, it often becomes difficult to obtain the desired overall speed or productivity. The clocking rates often become unmanageable, or the rate wherein the beam must be moved across the photoreceptive media becomes faster than is practicable. However, when as many scanning beams are used as there are pixels in a given scan line, the cost of the required electronic and optical parts is often excessively high. For example, in a high resolution scanner, it might be desired to image each of 5,000 pixels in a given scan line. To obtain an LED array with 5,000 elements, wherein none are defective, is excessively expensive. Both of the aforementioned problems are avoided with an intermediate number of scanning beams being used in the imager. In view of these incentives to use an intermediate number of scanning beams, it is important to understand why this is generally not done.

The incentives to use an intermediate number of scanning beams go beyond just that of the costs associated with the number of beams and the cost of modulating the beams. The optical and mechanical design of a system which uses an intermediate number of beams can desirably be adapted to imaging a relatively small region of the image. This permits the total optical distances to be shorter, and hence the cost of optical components, for a given degree of quality, can be lower.

One of the reasons for this lower cost is that the rates of movement of the scanning beams can be quite slow, compared to the rates required for a single beam scanner of comparable performance. While there are many ways of scanning a beam or group of beams across a photoreceptor, there is usually a trade to be made between speed and cost. With slower speed scanning systems, the mirrors can be larger and heavier, and the mechanical system for moving the mirrors does not need to be as immune to wear and inertially produced distortions.

SUMMARY OF THE INVENTION

An imaging device wherein an image is produced by sequentially scanning bandwise sections of the image, and projecting the scanned image sections via mirrors onto a reproducible surface. Each scan encompasses a plurality of image lines, and respective edge lines are overlapped on corresponding adjacent image sections. An indexing positioner incrementally positions the imaging device after each scan cycle, to produce an adjacent image scan, wherein the edge lines are overlapped and somewhat attenuated to provide an unbroken, continuous overall image.

It is a principal object of the present invention to provide a positioning system for an image scanner wherein the mechanical positioning of the image is both reproducible and accurate.

It is another object of the present invention to provide a scanning system wherein electro-optical compensation may be made to compensate for mechanical variations and misalignments.

DESCRIPTION OF THE PREFERRED EMBODIMENT

While there are many reasons to construct scanning systems with an intermediate number of scanning beams, the following argument will show that there is a technological advancement required before such systems can be feasible.

Consider a scanning system wherein a single beam is used, and consider the consequence of an error in the cross-scan velocity of the beam. In other words, consider what happens if the beam moves too much or too little between scan lines. If it moves too far on one line and too little on the next scan line, an obvious defect would be apparent. However, the percentage variation in velocity which is required to cause a noticeable error is large. Variations in velocity in the order of 1-2% would usually not be noticed. Moreover, the errors in this velocity which might exist typically do not change much between scan lines. Thus if the cross-scan velocity is too high at one point in the image, it will probably be too high at other nearby scan lines. While this might cause problems if absolute positioning is required, for most purposes such errors do not cause a visually discernible problem. Even if there were a variation of, for example, +/−2% between scan lines, this might not be a serious problem.

Now consider a scanning system wherein the number of scanning beams is equal to the number of pixels in a scan line. If the device which generates the plurality of beams, e.g. a light emitting diode (led) array, is manufactured so that some beams are closer together than others, this would cause an obvious problem. However, it is usually easy to manufacture such devices with a very uniform spacing. If the velocity of scanning these beams varies rapidly between scan lines, an obvious problem will also occur. However, it is usually easy to insure that velocity variations occur slowly, and therefore the defects in beam placement are not obvious to the user.

In summary, systems which utilize one scanning beam, and systems which utilize as many scanning beams as there are pixels on a scan line, are not adversely affected by minor variations in mechanical positioning of the scanning beam or beams.

Figure 1A:
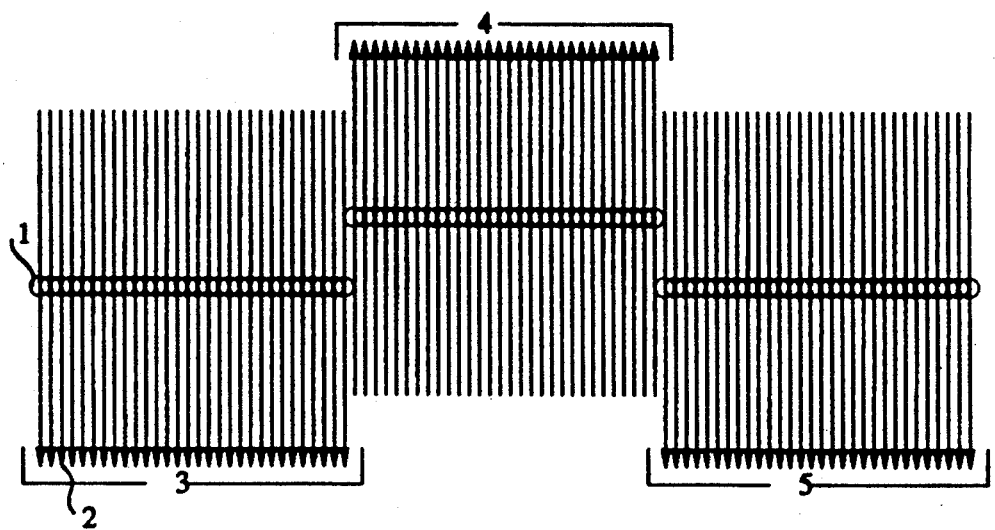
FIG. 1A diagrammatically illustrates the scanning sequence for a thirty element image scanner.
Figure 1B:
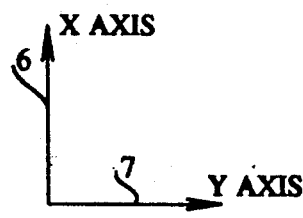
FIG. 1B illustrates the x- and y-axis definitions.

Finally, consider a system wherein the number of scan lines is intermediate between one and the number of pixels in a scan line. For example, consider an array of thirty scanning beams, oriented in the y-direction, which is scanned in the x-direction to cover a large number of pixels. In the first scan, rows #1 thru #30 would be imaged. When this is completed, the array is translated in the y-direction, and again scanned in the x-direction (or -x-direction). In this second scan, rows #31 thru #60 would be imaged. FIG. 1A illustrates the trajectories of the beams, and FIG. 1B illustrates the x- and y-axis definitions.

Now consider the consequence of a −1% error in the y-direction motion. That means that the information intended for row #31 would be written partially on top of row #30, and that area which should have received information for row #60 would not be fully imaged. Line #30 would be more intense than it should have been, and row #60 would be underexposed. For a single beam scanning system to create the same error, a −30% error in velocity would be required. This is an unlikely circumstance. Two effects would be apparent. The most noticeable effect is that the area of row #30 would have significantly more exposure than it should have received. If, for example, this region was generally to appear at an exposure level of 40%, it would instead appear at an exposure level of about 52%. Considerably less conspicuous would be the fact that objects on either side of row #30 would be closer together than they were intended to be. It should be emphasized that, to the human eye, the alteration in density levels is by far the more conspicuous problem. A trained observer can detect a line whose exposure level is only a few percent different than that of its surroundings, but observers usually cannot tell whether objects within an image are displaced, being too close or too far from each other. Thus the errors in exposure are of a higher priority to avoid.

Another problem could be present in a scanning system with an intermediate number of beams. There is an optical magnification factor to be considered, wherein there is a plurality of light sources, and there is a corresponding image of these light sources on the photoreceptor. The ratio between these two sizes is the optical magnification factor. If, for some reason, this optical magnification factor should change between one region and another region, a mismatch in information will occur. This would have a similar effect to that of an error in the y-displacement between scans. Such an effect would easily occur if minor mechanical errors are present in the system.

It can be concluded that a very high degree of precision, or effective compensation for imprecision, with regard to positioning of the beams and the optical magnification of said beams, is required in systems which scan an intermediate number of beams at a time.

Conventional imagers have been limited by the precision with which an image can be placed on a photoreceptive medium. Generally they have been constructed so as to require extremely accurate placement of various components, and thus have required large and heavy mechanical components. One of the common techniques of establishing a cross-axis position in a flat bed imager is to advance a mirror with a lead screw. Unfortunately, such devices do not permit absolute precision. This is due to the facts that (1) balls in ball bearings are not perfectly round, (2) some wear occurs in all moving parts, and (3) oil films, if present to reduce wear, will allow some variation in position, as a function of the amount of oil and its temperature (which effects its surface tension and viscosity). Imagers which are not flat bed imagers, but rather wrap the film around a movable drum or circular cylinder, must control the angular position of the film around the drum, and so must position the drum precisely. In prior art devices this is obtained only with considerable expense.

Image reproducing machines which operate by sequentially scanning adjacent bands of an image are referred to herein as "bandwise imagers." They are to be distinguished from image reproducing machines which operate by sequentially scanning and reproducing an image one line at a time, and from devices which operate by reproducing an entire image at one instant in time. A bandwise imager has substantial inherent advantages over other types of imagers, but has one major drawback, that being a tendency to show visible discontinuities between adjacent bands. FIG. IA shows a diagrammatic representation of the operation of a bandwise imager, wherein the circles 1 represent the position of the imager at arbitrary points within a first sweep 3, a second sweep 4, and a third sweep 5. The arrows 2 show the direction of travel during each of the sweeps. FIG. 1B shows a definition of the respective axes which will be referred to herein, and defines x-axis 6 and y-axis 7, relative to directions shown in FIG. 1A. FIG. IA diagrammatically represents a bandwise imager which simultaneously sweeps thirty lines, which may be accomplished by utilizing an electro-optic light valve assembly having thirty cells.

Figure 2:
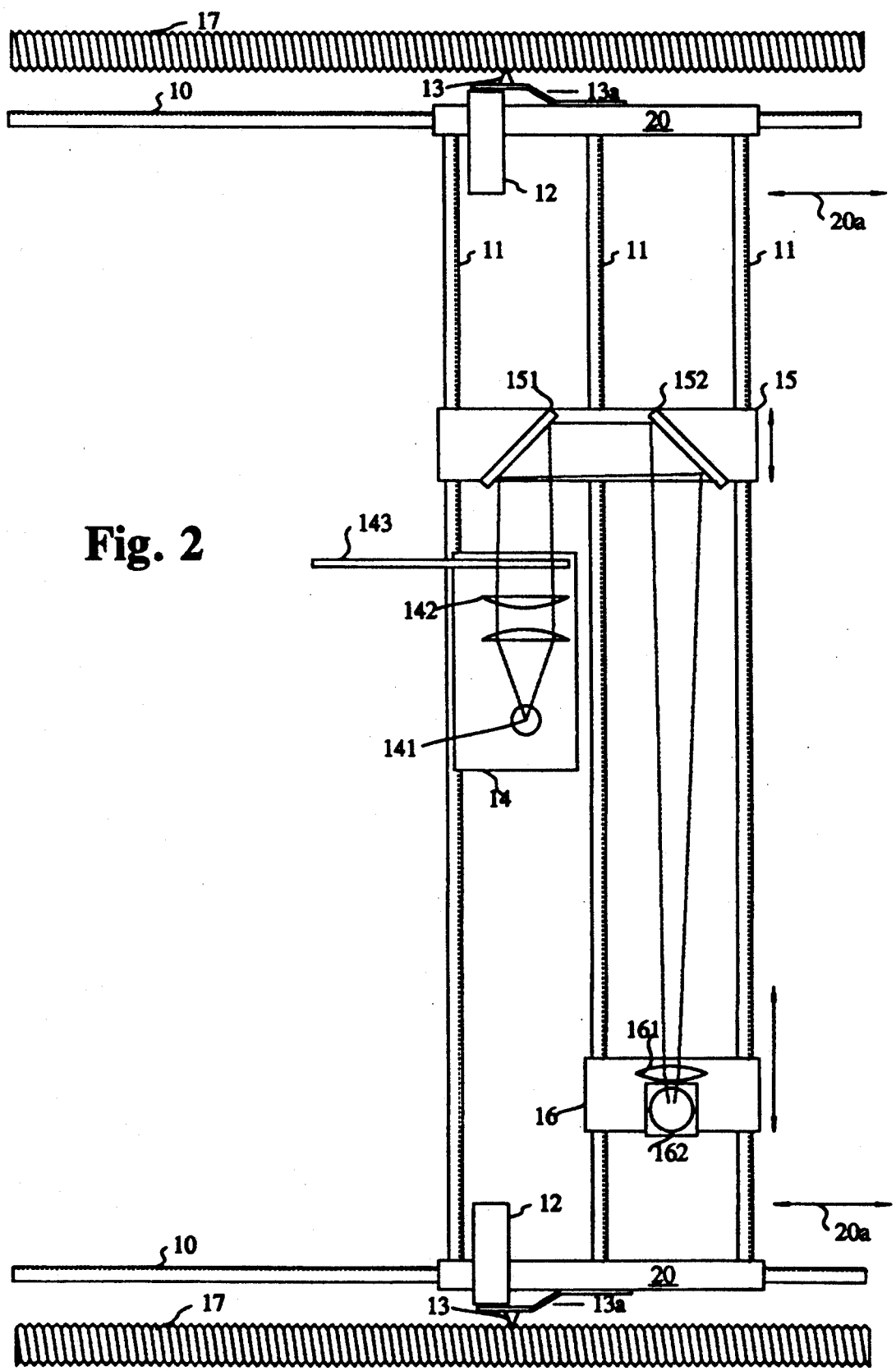
FIG. 2 shows a plan view of an optical system according to a preferred embodiment of the invention.
Figure 3:
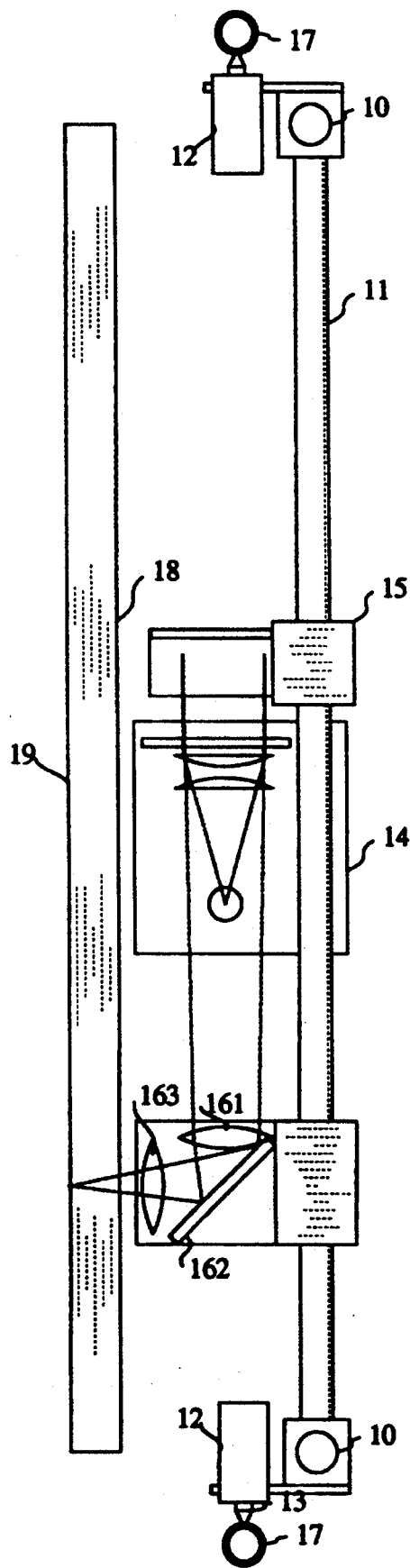
FIG. 3 shows a side elevation view of the system of FIG. 2.

The basic optical design of the preferred embodiment is illustrated in top view in FIG. 2, and in side view in FIG. 3. A pair of translation guide rods 10 are arranged in parallel relationship, one on either side of the reproduction surface 19 upon which the image is to be focused. Translation guide rods 10 extend somewhat beyond the image reproduction surface. A pair of translation carriages 20 are slidably affixed to translation guide rods 10, one carriage on each guide rod 10. Three scan guide rods 11 are affixed between translation carriages 20, to form scanning guides. The translation guide rods 10, and the scan guide rods 11, are preferably formed of rigid metallic rods having a very smooth exterior surface, to facilitate sliding. The translation guide rods 10 and the scan guide rods 11 form the basis of an x-y motion system. A mirror carriage 15 and an objective lens carriage 16 are each slidably affixed between scan guide rods 11. Mirror carriage 15 is slidably attached to the outer scan guide rods 11, while objective lens carriage 16 is slidably attached between two of the scan guide rods 11.

A pair of threaded rods 17 are affixed in parallel relationship to translation guide rods 10. The threads on threaded rod 17 are selected to have a pitch corresponding to the desired spacing between adjacent image scans. Translation carriages 20 are indexed to threaded rod 17 by means of locating pins 13, which are connected to carriages 20 by means of leaf springs 13a. A pair of solenoids 12, one mounted to each translation carriage 20, are actuable to engage and disengage locating pins 13 into respective threads along threaded rods 17.

Translation carriages 20 may be moved along the direction of the horizontal arrows 20a by means of a stepper motor which may be connected to carriages 20 by cables (not shown). Movement of translation carriages 20 is accomplished by first actuating solenoids 12 to release locating pins 13 from engagement with threaded rods 17, and then by actuating the stepper motor and reengaging locating pins 13 into the next adjacent thread in threaded rods 17.

Mirror carriage 15 and objective lens carriage 16 may be connected via wire rope and pulleys to a stationary brushless DC motor (not shown), to be driven at relatively constant speed along scan guide rods 11. The mechanical drive connections to mirror carriage 15 and objective lens carriage 16 provide for moving mirror carriage 15 at ½ the distance of objective lens carriage 16 during an image scan cycle. For example, mirror carriage 15 may be driven from its relatively central position shown in FIG. 2 to a position near the upper translation carriage 20, during the same time interval where objective lens carriage 16 is driven from its position shown in FIG. 2 to a position near the upper translation carriage 20. During the next sequential scan interval, the respective carriages are driven back to the position shown in FIG. 2.

A lamp assembly 14 is held in fixed and stationary relationship relative to scan guide rods 11. Lamp assembly 14 holds a lamp 141, a condensor lens assembly 142, and an electro-optic light valve assembly 143. The light illuminated from light 141 is focused through condensor lens assembly 142, and projects through electro-optic cell assembly 143 to produce a light image.

Mirror carriage 15 holds a first mirror 151 and a second mirror 152, each of which are aligned at an angle of 45° relative to the optical axis of lamp assembly 14. Objective lens carriage 16 holds a first objective lens 161, a mirror 162, and a second objective lens 163. Lens 161 is aligned to receive the light beam reflected from mirror 152, and this light beam is directed by mirror 162 and lens 163 to a focal point on the surface 19 of glass cover plate 18. A photo-sensitive medium such as paper may be placed over glass cover plate 18 to receive the focused image, and to record a permanent fixation of the image.

In operation, mirror carriage 15 is driven at ½ the rate of objective lens carriage 16 along scan guide rods 11, so as to maintain a constant total optical distance from electro-optic cell assembly 143 to objective lens 161. The respective assemblies are driven along scan guide rods 11 until an end of travel position is sensed, whereupon further scan motion is stopped. Solenoids 12 are then actuated to pull locating pins 13 away from threaded rods 17, and a stationary stepping motor connected to carriages 20 is activated to move the carriage assemblies 20 along translation guide rods 10. The solenoids 12 are then deactivated to reposition locating pins 13 into the next adjacent thread in threaded rods 17. If the electro-optic cell assembly 143 is designed to hold and image a band of 32 pixels, the thread pitch of threaded rod 17 is machined to position each adjacent scan a distance of 30 pixels, thereby providing for an overlap of two pixels in each scan.

A microprocessor system may control the stepping motor, to control the translation of the optical system, in a manner which is well known in the art. The microprocessor may be programmed to translate the assembly over a predetermined distance, or until certain optical interrupter signals are received from sensors strategically positioned to sense the positions of the various carriages. During operation the microprocessor need only count the number and direction of control cycles which are used to control the stepping motor.

The wire ropes which link the stepping motor to the optical assembly are sufficiently flexible (a condition which occurs with most wire rope systems) so that the contact between locating pins 13 and the threaded rods 17 provides a certain amount of repositioning of the optical system, and such repositioning is not inhibited by the wire rope system. Moreover, the entire mechanical assembly between the two locating pins 13 is sufficiently flexible so that when each pin 13 is released to contact the threaded rod 17, contact of each locating pin in two spots on either side of each pin is not inhibited by the intervening assembly of scan guide rods 11 and end mounting parts. It should be understood that the amount of repositioning is generally a fraction of a mil (0.001"), and so such flexibility would be obtained in most mechanical systems unless substantial pains were taken to make the system more rigid.

It should be understood that the contacting of each pin 13 in exactly two places, on either side of the pin, will occur in precisely the same way on successive operations of the scanner. The threaded rod may and probably will contain very small irregularities. On a scale of microns, it might be somewhat rough. However, the amount of wear which occurs is minimal since the pins are only contacting the rods and doing very little sliding.

The threaded rods 17 are held securely within a basic framework. Relative to other fixed objects, such as the cover plate 18, these rods provide a very stable reference position. The force with which the locating pins 13 engage these rods 17 is sufficient to establish the same position whenever this is done to a precision limited primarily by the thermal expansion and contraction of said rods, which is small. The threaded rods are made of hardened steel material, and so would experience minimal wear with repeated operations.

At the time of initial construction, one or both of the threaded rods is rotated so as to guarantee that the scan rods 11 are exactly orthogonal to the translating guide rods 10 and to provide alignment between the grooves in the threaded rods 17 and the normal stopping points of the stepping motor which provides the translation.

In addition to providing highly reproducible positioning, the threaded guide rods 17 also provide an accurate position, being precisely machined. This system can be compared to an inferior system similar to prior art devices wherein the threaded rods are used as lead screws similar to the action of a lathe to reach the desired position. This approach requires that minimal rotational error be achieved and minimal backlash in the mating member be accomplished. The rotational accuracy is difficult to obtain and the absence of backlash would produce more wear than that of the present invention.

Figure 4:
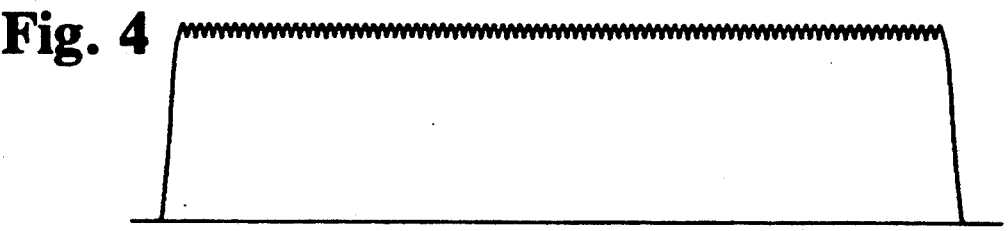
FIG. 4 diagrammatically illustrates the integrated intensities for a thirty beam linear array scanner if there is no misalignment of any of the pixels.

With repeated usage, the positions reached by the scan rods for a given pair of positions along the threaded rod will not vary significantly from time to time. Despite attempts at precision machining of these rods, some errors will still occur. The errors will always be the same, or nearly the same, despite repeated usage of the imager. Detailed information regarding the amount of error present in the system may be stored in a nonvolatile memory within the system, and this information can be used, together with imaging information and other calibration information, to program the cells which image into the area of overlap between scans. This can be better understood by reference to simulated integrated exposure graphs in FIGS. 4–7. In FIG. 4 the integrated exposure is for a system which has thirty cells, and no positioning error occurs. This calculation assumes a gaussian beam energy profile as might be obtained in an optical system wherein the beam size is limited primarily by the diffraction of light. It can be seen that the exposure is quite uniform over the region of exposure. It is to be understood that the photographic film would even out the minor ripple-like variations which are seen.

Figure 5:
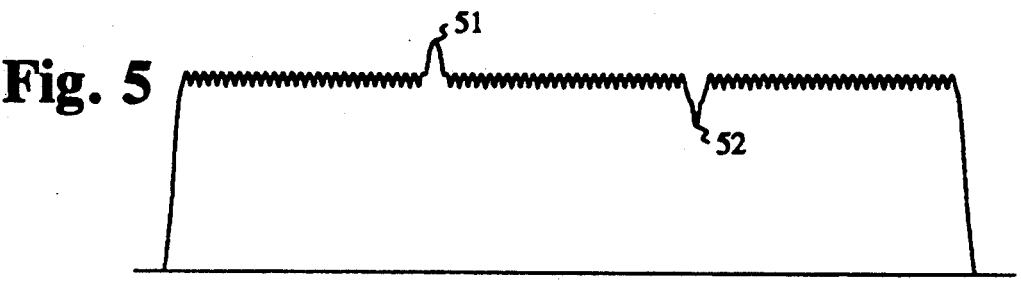
FIG. 5 illustrates the diagram of FIG. 4 with a misalignment error.

In FIG. 5 the same calculation is repeated, for a 30-cell system, but the central scan is assumed to have been located with a −1% error (i.e. about ⅓ of a pixel). In a system imaging at 300 pixels per inch, this error would be about one one-thousandths of an inch. In an alternative system imaging at 1,200 pixels per inch, this error would be about 0.00028 inch. It is altogether reasonable that such errors might occur even in a precisely machined system. It can be seen that a conspicuous overexposure occurs at one point 51, and a conspicuous underexposure occurs at another point 52. This figure is intended to illustrate a "before" situation wherein in a subsequent figure a similar situation will be illustrated which embodies the subject invention.

Figure 6:
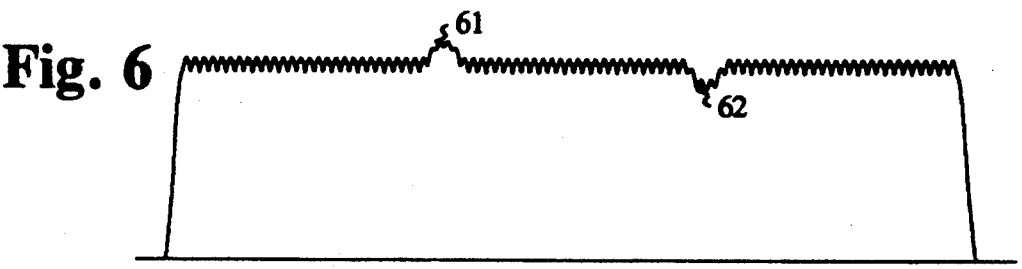
FIG. 6 diagrammatically illustrates the integrated intensities for a 32 beam scanner, with the outside two beams overlapped, and with misalignment.

In FIG. 6, a portion of the subject invention is employed in contrast with the situation represented in FIG. 5; namely, that the number of cells has been increased from 30 to 32, with the far edge cells (#1 and #32) being programmed to operate at 33% of normal intensity, and the adjacent cells (#2 and #31) being programmed to operate at 67% of normal intensity. It can be seen in comparison with FIG. 5, that the magnitude of the overexposure at region 61 and underexposure at region 62 is reduced, but the region over which it occurs has been widened.

Figure 7:
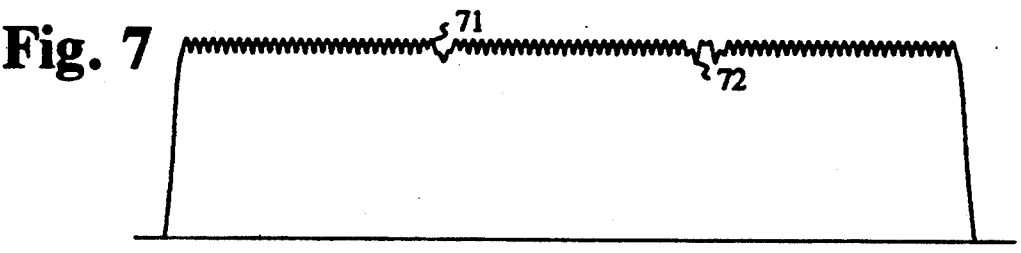
FIG. 7 illustrates the integrated intensities of FIG. 6 with edgewise adjustment according to the teachings of the invention.

In FIG. 7 the conditions are the same as in FIG. 6, except that the intensities of the overlapping cells are reprogrammed to be different from 33% and 67%. In region 71 the relative intensities of cells #31, #32, #1 and #2 are 48%, 31%, 35% and 59% respectively. In region 72, the relative intensities of cells #31, #32, #1 and #2 are 56%, 48%, 51% and 58% respectively. These intensities are calculated by an iterative process which mathematically models the beam shape and looks for the minimum sum of the squares of the deviation from idealized behavior.

Figure 8A:
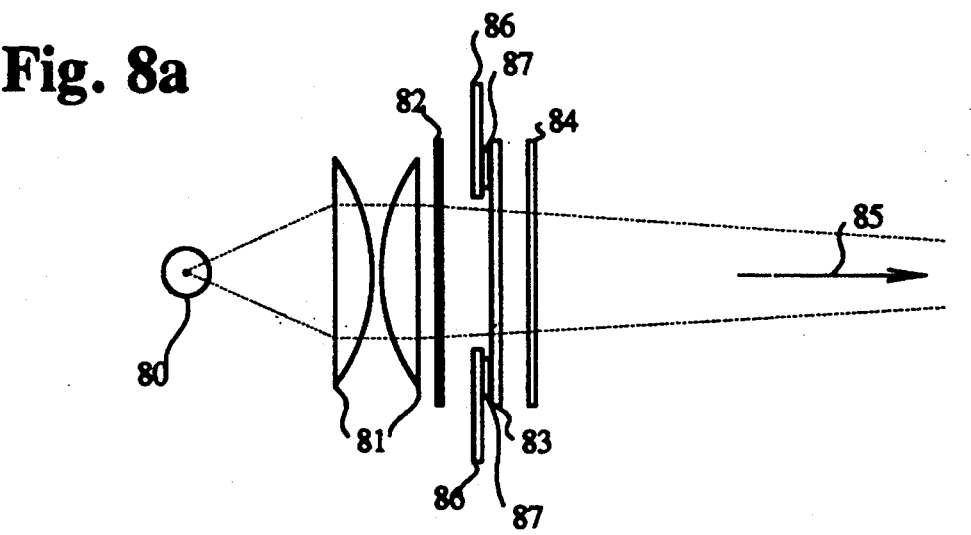
FIG. 8A shows an electro-optic cell assembly.

The advantages of this invention can be realized with any of many systems of generating a plurality of light sources. One such system is illustrated in FIG. 8A, that being a linear array of electro-optic cells. Light is generated by lamp 80 (comparable to lamp 141 in FIG. 2) and focused in a beam 85 toward a remote objective lens (assembly 16 in FIG. 2) by condensing lenses 81. This light is then polarized by polarizer 82. Additional polarization may occur within electro-optic linear array 83 which is made of a piezoelectric ceramic chip attached via a zebra strip connector 87 to a printed circuit board 86. Light of suitable polarization is passed through a second sheet of polarizing material 84, which, according to accepted terminology, is referred to as an analyzer. Depending on the electric potentials within electro-optic array 83, the polarization of light reaching analyzer 84 will be rotated or not rotated so as to allow or not allow light to pass through this analyzer. Typically 32 or 64 cells along a linear axis might be used in such an array. Electro-optic cell material is manufactured by a number of companies, including Motorola Ceramic Products Components Division, Albuquerque, N.M., and descriptions of usage of such materials are available in their data sheets. One such material is known as PLZT material.

Figure 8B:
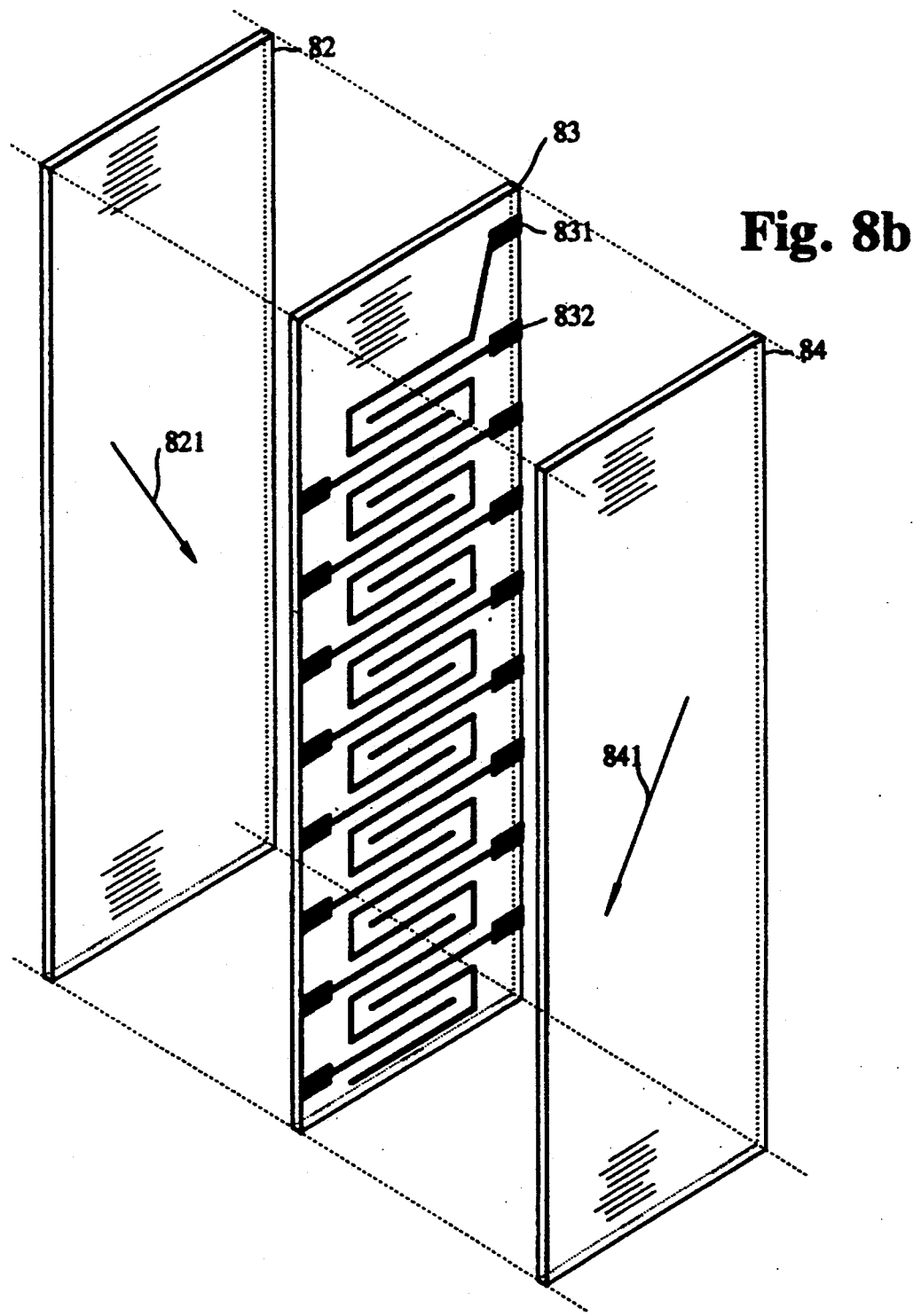
FIG. 8B shows one form of construction for the components of FIG. 8A.

FIG. 8B illustrates some of the components of FIG. 8A in greater detail. Polarizer 82 is oriented so that its axis of polarization is aligned as shown by arrow 821. Light with this spector of polarization then impinges on electro-optic cell array 83 which, for ease of illustration, is shown as having only 16 cells in FIG. 8B. A larger array of 32 cells per chip could be similarly constructed. The electrical conducting paths on either side of electro-optic cell array 83 are arranged so as to make contact with mating contacts of zebra strip connector 87. Zebra strip connector 87 also makes contact with similarly positioned tabs on printed circuit board 86. For example, conductive pad 831 connects to a common electrode structure, and the other pads, such as pad 832, connect to control electrodes. A voltage applied to any control electrode, relative to the common electrode, will cause a very slight bending in the region of that electrode, because of the piezoelectric nature of the electro-optic cell material. This bending causes stress, and the stress causes the vector of polarization of the light to be rotated. In the region around each control electrode, the light passing through that region will have the degree of polarization which is dependent upon the control electro-voltage. If the vector is unrotated, virtually all of the light is blocked by polarizing material 84 (analyzer). The polarizing direction of material 84 is indicated by arrow 841. If, on the other hand, the vector of polarization of light is rotated by 90° in material 83, then the maximum amount of light (typically about 27%) will be passed through the assembly. For intermediate voltages to a control electrode, such as control electrode 832, intermediate amounts of light will be passed. Thus, a plurality of controllable light sources is obtained by the components of lamp assembly 14. Typically, the separation between a control electrode and a common electrode is about 0.015 inch, for a Motorola Type 9065 PLZT material. The required voltage for maximum light transmission is about 350 volts. The response time (10% to 90%) for such a device is about 30 microseconds.

An imager using the preferred embodiment of this invention would contain a preferably nonvolatile memory wherein the errors present in the system are stored. The writing of data into this memory is accomplished initially when the imager is manufactured, and subsequently by the user when it is felt that sufficient changes in the system (i.e. due to wear or shipping damage) have occurred to justify recalibration.

This calibration and recalibration system operates as follows. A test pattern is imaged onto a piece of film. This test pattern may be any of many patterns which might make discontinuities between bands apparent, such as an attempted 50% uniform exposure over the entire region. The film is developed and scanned to determine the amount of discontinuity between bands. Then, based on a combination of mathematical modeling of the system and past experience, the desired correction is applied. A second test pattern may then be imaged and subsequent adjustments of the correction applied until the desired uniformity is obtained. During the time of initial manufacturing of the first few imagers, a certain amount of trial and error might be required to obtain the best correlation between errors seen and corrections to be applied to eliminate that amount of error. Once some experience has been obtained, the best tables to correlate the two will be obtained and the desired performance should be possible after the first calibration cycle.

The error information may be stored for lens assembly 16 position near each end of the scan rods 11, since the errors at one end might not be the same as they are at the other end. For positions midway between the two ends the amount of correction to be applied could be prorated according to the position. A look-up table could be used so as to convert from positional errors or information which can be correlated to positional errors to modified exposure correction factors.

Figure 9A:
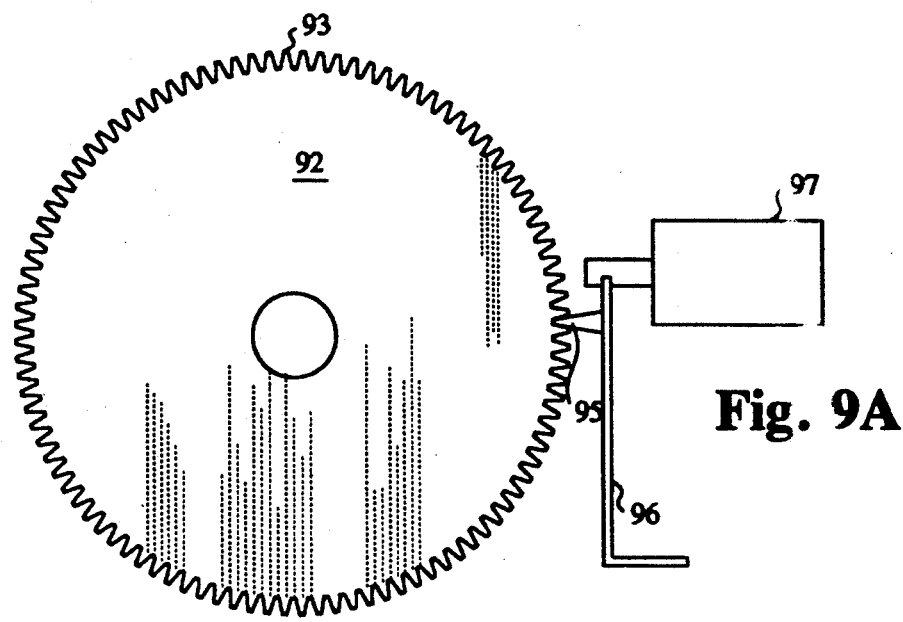
FIG. 9A shows an alternative embodiment utilizing the invention.
Figure 9B:
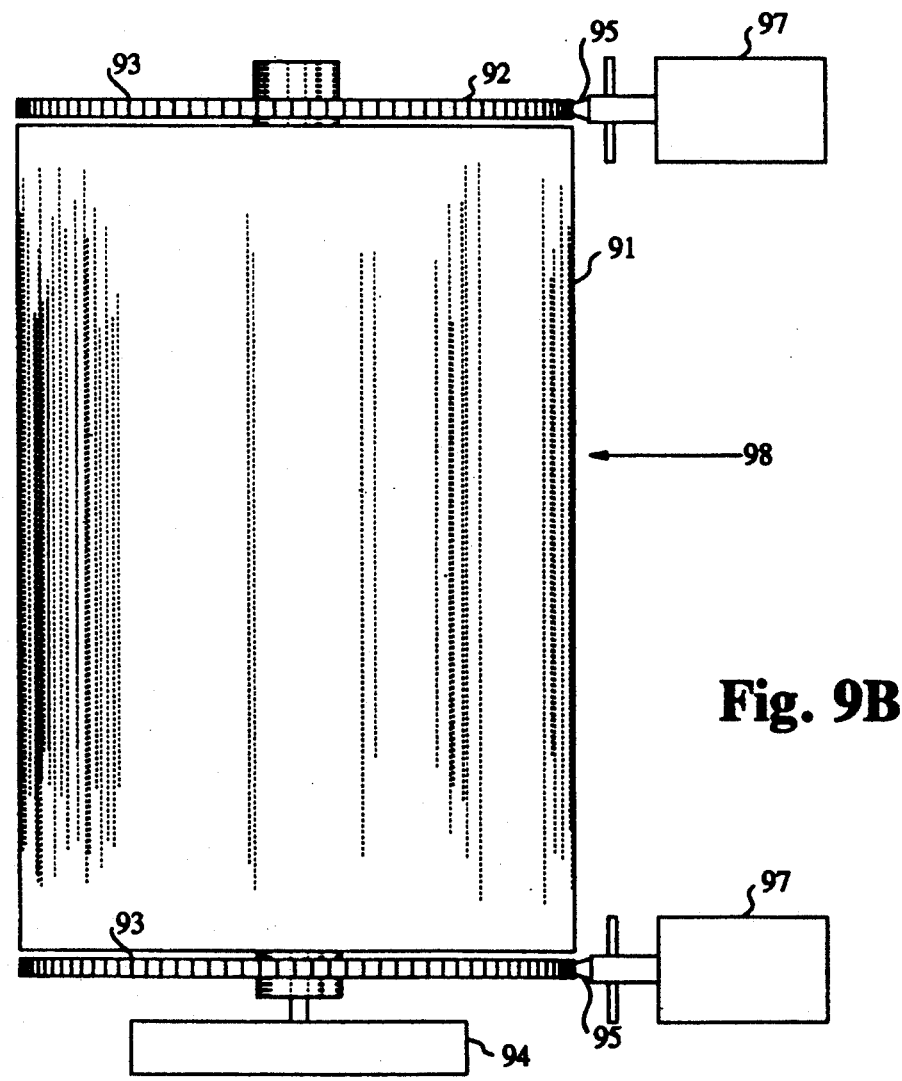
FIG. 9B shows a top view of the alternative of FIG. 9A.

While the foregoing embodiment of the invention involves a flat bed scanner, this invention is also applicable to a drum-based imager. FIG. 9A illustrates the end view of a portion of such an imager and FIG. 9B illustrates the top view of same. A drum 91 is mounted on a central shaft 92 which also supports each of two gears 93 and a stepping motor 94. The film or other photoreceptive media (or the drum itself might be photoreceptive in a xerographic system) is wrapped around the drum, emulsion side out. Each of two pins 95 are supported by flexures 96 which force the pins into the gears 93. They are removed from the gears by solenoids 97. The remainder of the optical system is not shown but is similar to the scanning system illustrated in FIGS. 2 and 3. The optical beam at a typical position 98 impinges radially toward the photoreceptor wrapped around the drum. The optical system is telecentric (i.e. the solid angle of the rays from the optical system is constant as the distance from the drum to the imaging system is varied through a small amount). This optical system contains a movable lens and mirror assembly which traverses a path near the surface of the drum imaging onto the drum and moving parallel to the axis of the drum. After each pass of imaging the solenoids pull the pins away from the drums; the stepping motor or other means of rotation rotates the drum such that the surface advancement is approximately the width of one band of image. Then the solenoids release the pins and slight repositioning of the drum's tangential position occurs as the pins engage the gears. The stepping motor permits such repositioning. The number of teeth in the gear is chosen in concert with the design of the remainder of the system so that the interval between bands is equal to the interval between an integral number of gear teeth.

Although also not shown, other components as would be obvious to practitioners of this art (e.g. bearings, a control system, etc.) would be also included.

A variety of techniques can be used for generation of multiple light sources in a more or less linear array. One technique of using light valves has been discussed in the preferred embodiment above. Those skilled in the art of electronic imaging will recognize that a variety of other techniques are also subject to this invention. An array of light emitting diodes or laser diodes could be used. A single point light source (such as a laser or laser diode) could be used with a polygon mirror or a self-resonant scanner (as described in U.S. Pat. Nos. 4,686,363; 4,630,223; 4,571,623 or 4,586,057) or a hologram scanner to scan a linear field so as to create the same general effect as a number of fixed light sources. In each case it is desirable that any visible discontinuity between bands of an image be eliminated. In each case it is necessary to remove any discontinuity between bands of imaging. One way of doing that would be to remove virtually all inaccuracy from the system by use of very rigid and very accurate mechanical components. A preferable technique is to use the teaching of the present invention.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. An apparatus for recording an image on a photoreceptor, comprising:

(a) a plurality of controllable light-producing means arranged in a regular pattern, for producing an image at said photoreceptor;

(b) means for moving the image of said plurality of light-producing means in a first direction, between a first reference position and a second reference position whose locations are exactly predetermined, including means for producing a first band of image pixels at a photoreceptor in accordance with said light-producing means and said motion;

(c) means for moving said plurality of light-producing means in a second direction, more or less parallel to said first direction, between a third reference position and a fourth reference position whose locations are also exactly predetermined, including means for producing a second band of image pixels, a portion of said second band of image pixels overlapping said first band of image pixels;

(d) means for adjusting the exposure resulting from said light-producing means which overlaps the two bands in accordance with the separation between said first band and said second band of image pixels.

2. The apparatus of claim 1, further comprising means for indexing said means for moving, to produce each of said first and second band of image pixels respectively at repeatable locations.

3. The apparatus of claim 2, wherein said means for indexing further comprises a mechanical member engaging a toothed member.

4. The apparatus of claim 3, wherein said toothed member further comprises a threaded rod.

5. The apparatus of claim 4, wherein said mechanical member further comprises an engagement pin.

6. The apparatus of claim 1, wherein said plurality of light-producing means further comprise a plurality of electro-optic light values.

7. The apparatus of claim 1, wherein said means for moving said plurality of light-producing means in a first direction and in a second direction further comprises a first carriage having means for receiving the image from said light-producing means and reflecting same along an axis, and second carriage having means for receiving the image reflected along said axis and reflecting same to said photoreceptor.

8. The apparatus of claim 7, wherein said first and second carriages are movable in a direction parallel to said axis.

9. The apparatus of claim 8, further comprising means for supporting said photoreceptor on a plane parallel to said axis.

10. The apparatus of claim 8, further comprising means for supporting said photoreceptor on a drum aligned parallel to said axle.

11. A method for recording an image on a photoreceptor by sequential scanning and exposure of a plurality of groups of overlapped and adjacent image sections, wherein each group comprises a predetermined number of lines of image pixels, at least some of the lines of image pixels being edge lines, comprising the steps of (a) scanning a predetermined number of lines of image pixels in said group;

(b) selectively reducing exposure of an integral number of edge lines;

(c) applying said lines of image pixels to said photoreceptor;

(d) moving to an adjacent image section overlapping a previously scanned image section by an integral number of lines of image pixels;

(e) repeating steps (a), (b), (c) and (d) until the plurality of groups of overlapped and adjacent image sections have been scanned and applied to said photoreceptor.

12. The method of claim 11, wherein the step of selectively reducing exposure of an integral number of edge lines of image pixels further comprises reducing exposure of an integral number of edge lines to provide uniform appearance of the overlapped and adjacent image sections.

13. A method of reproducing an image onto a photoreceptive medium from a plurality of light-producing devices, comprising the steps of:

(a) imaging said plurality of light-producing devices onto said photoreceptive medium;

(b) moving the images of said light-producing devices in a first direction, between a first reference position and a second reference position whose locations are exactly predetermined, producing a first band of images at said photoreceptive medium in accordance with said light-producing devices and said motion;

(c) moving the images of said light-producing devices in a second direction, parallel to said first direction, between a third reference position and a fourth reference position whose locations are also exactly predetermined, producing a second band of images a portion of said second band of images overlapping said first band of images; and (d) adjusting the exposure resulting from said light-producing devices which overlaps the two bands in accordance with the separation between said first band and said second band of images.

* * * * *

UNITED STATES PATENT AND TRADEMARK OFFICE
CERTIFICATE OF CORRECTION

PATENT NO. : 5,225,851
DATED : July 6, 1993
INVENTOR(S) : DAVID J. SCHOON

It is certified that error appears in the above-identified patent and that said Letters Patent is hereby corrected as shown below:

In column 12, line 3, for "axle" read --axis--.

Signed and Sealed this

Fifteenth Day of February, 1994

Attest:

BRUCE LEHMAN

*Attesting Officer*       *Commissioner of Patents and Trademarks*